US008817003B2

(12) United States Patent
Kim

(10) Patent No.: US 8,817,003 B2
(45) Date of Patent: Aug. 26, 2014

(54) POWER SUPPLY UNIT AND ORGANIC LIGHT EMITTING DISPLAY DEVICE USING THE SAME

(75) Inventor: Min-Cheol Kim, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 467 days.

(21) Appl. No.: 12/637,677

(22) Filed: Dec. 14, 2009

(65) Prior Publication Data

US 2010/0220088 A1 Sep. 2, 2010

(30) Foreign Application Priority Data

Feb. 27, 2009 (KR) ........................ 10-2009-0016731

(51) Int. Cl.
*G06F 3/038* (2013.01)
*H02J 1/00* (2006.01)
*G09G 3/30* (2006.01)

(52) U.S. Cl.
USPC .......................................... 345/211; 345/204

(58) Field of Classification Search
USPC ................ 345/211, 55, 87, 98, 100, 209, 214
See application file for complete search history.

(56) References Cited

U.S. PATENT DOCUMENTS

| 6,424,875 | B1* | 7/2002 | Yoon ............................... 700/94 |
| 6,879,174 | B2* | 4/2005 | Uchida ..................... 324/762.02 |
| 2001/0035864 | A1* | 11/2001 | Lee ................................. 345/211 |
| 2003/0151617 | A1* | 8/2003 | Morita .......................... 345/690 |
| 2006/0262069 | A1* | 11/2006 | Do et al. ........................ 345/98 |
| 2008/0180367 | A1 | 7/2008 | Lee |
| 2008/0186297 | A1* | 8/2008 | Morita .......................... 345/211 |
| 2008/0290805 | A1* | 11/2008 | Yamada et al. ............. 315/169.1 |
| 2008/0291191 | A1* | 11/2008 | Zhao et al. ..................... 345/211 |

FOREIGN PATENT DOCUMENTS

| CN | 1437083 A | 8/2003 |
| CN | 101217021 A | 7/2008 |
| CN | 101231818 A | 7/2008 |
| EP | 1 335 346 A1 | 8/2003 |

(Continued)

OTHER PUBLICATIONS

JPO Office Action dated Nov. 15, 2011 for corresponding Japanese Patent Application No. 2009-103022, listing the cited reference as well as JP 2008-176306, JP 2000-330652, JP 11-018414, JP 2006-136100, and JP 2001-037208, all of which were cited in an IDS submitted on Oct. 4, 2011, 3 pages.

(Continued)

*Primary Examiner* — Andrew Sasinowski
(74) *Attorney, Agent, or Firm* — Christie, Parker & Hale, LLP

(57) ABSTRACT

A power supply unit adapted to prevent or reduce damage to devices when the devices receive power with an abnormal voltage, and an organic light emitting display device using the same. An embodiment of the present invention provides a power supply unit, including: a power block including an input terminal for receiving an input power, an output terminal for outputting an output power, and an enable terminal for receiving an enable signal for controlling a driving of the power block; an input power unit configured to concurrently transfer the input power to the input terminal and the enable terminal; and a controller configured to control a voltage of the input power transferred to the enable terminal to determine the driving time point of the power block, and an organic light emitting display device using the same.

8 Claims, 2 Drawing Sheets

(56) References Cited

FOREIGN PATENT DOCUMENTS

| | | |
|---|---|---|
| EP | 1 942 485 A2 | 7/2008 |
| JP | 4-40313 U | 4/1992 |
| JP | 11-018414 | 1/1999 |
| JP | 2000-330652 | 11/2000 |
| JP | 2001-037208 | 2/2001 |
| JP | 2006-136100 | 5/2006 |
| JP | 2008-176306 | 7/2008 |
| KR | 10-2002-0009990 | 2/2002 |
| KR | 10-2005-0025511 | 3/2005 |
| KR | 10-2005-0112861 | 12/2005 |
| KR | 10-2005-0113855 | 12/2005 |
| KR | 1020060080272 A | 7/2006 |
| KR | 1020080010581 A | 1/2008 |

OTHER PUBLICATIONS

Japanese Office action dated Jul. 19, 2011 issued to Patent Application No. 2009-103022 which claims priority to the corresponding Korean priority application No. 10-2009-0016731, listing the cited references in this IDS, 5 pages.

Korean Office action dated Jul. 8, 2011 issued to corresponding priority application No. 10-2009-0016731, listing the cited references in this IDS, 1 page.

European Search Report dated Feb. 22, 2012, for corresponding European Patent application 10151586.4, 7 pages.

SIPO Office action dated Mar. 26, 2012, for corresponding Chinese Patent application 200910261532.X, 4 pages.

*CS8101—Micropower 5.0 V, 100 mA Low Dropout Linear Regulator with Rest and Enable*, Semiconductor Components Industries, LLC, Sep. 2008—Rev. 19, 11 pages, XP-002669359.

SIPO Patent Gazette dated Oct. 23, 2013, with English translation of cover page, corresponding to Chinese Patent application 200910261532.X, (3 pages).

* cited by examiner

POWER SUPPLY UNIT AND ORGANIC LIGHT EMITTING DISPLAY DEVICE USING THE SAME

CROSS-REFERENCE TO RELATED APPLICATIONS

This application claims priority to and the benefit of Korean Patent Application No. 10-2009-0016731, filed on Feb. 27, 2009, in the Korean Intellectual Property Office, the entire content of which is incorporated herein by reference.

BACKGROUND

1. Field of the Invention

The present invention relates to a power supply unit and an organic light emitting display device, and more particularly, to a power supply unit that stabilizes its output voltage to prevent or reduce damage to devices powered by the power supply unit, and an organic light emitting display device using the same.

2. Discussion of Related Art

Recently, various flat panel display devices having less weight and volume than a cathode ray tube (CRT) display device have been developed. The various flat panel display devices include a liquid crystal display device, a field emission display device, a plasma panel display device, an organic light emitting display device, etc.

Among the display devices, the organic light emitting display device displays an image using organic light emitting diodes (OLEDs) that generate light by recombination of electrons and holes generated corresponding to a flow of current.

The organic light emitting diode includes a light emitting layer of an organic material.

Such an organic light emitting display device has relatively high color reproducibility and is relatively thin, so that its applications are expanding to various markets, e.g., cellular phone, PDA, and MP3 markets.

The organic light emitting display device as described above operates by receiving input power from a power supply unit. Here, the power supply unit operates by receiving the input power and an enable signal that determines the operation of the power supply unit, wherein the input power is transferred directly to the power supply unit in the early stage of driving, but the enable signal is transferred through a timing controller. Therefore, the enable signal is transferred to the power supply unit after the timing controller is operated so that the enable signal is transferred to the power supply unit, having a time difference, after the input power is transferred.

Due to this time difference as described above, the power supply unit may malfunction and lead to a case where a voltage from an output power of the power supply unit is output before the power supply unit should normally operate so that the voltage from the output power is abruptly raised.

If the voltage from the output power is abruptly raised as described above, components supplied with voltage by the power supply unit may be damaged.

SUMMARY OF THE INVENTION

An aspect of an embodiment of the present invention is directed toward a power supply unit that prevents damage to or protects devices from receiving power with an abnormal voltage from the power supply unit, and an organic light emitting display device using the same.

According to a first embodiment of the present invention, there is provided a power supply unit, including: a power block including an input terminal for receiving an input power, an output terminal for receiving an output power, and an enable terminal for receiving an enable signal to control a driving of the power block; an input power unit configured to concurrently transfer the input power to the input terminal and the enable terminal; and a controller configured to control a voltage of the input power transferred to the enable terminal to determine a driving time point of the power block.

According to a second embodiment of the present invention, there is provided an organic light emitting display device, including: a display region configured to receive data signals and scan signals to display an image; a timing controller configured to generate control signals; a data driver configured to transfer the data signals to the display region; a scan driver configured to transfer the scan signals to the display region; and a power supply unit configured to transfer a driving power to at least one of the display region, the data driver, and the scan driver, wherein the power supply unit includes: a power block that includes an input terminal for receiving an input power, an output terminal for receiving an output power, and an enable terminal for receiving an enable signal to control a driving of the power block; an input power unit configured to concurrently transfer the input power to the input terminal and the enable terminal; and a controller configured to control a voltage of the input power transferred to the enable terminal to determine a driving time point of the power block.

According to a third embodiment of the present invention, there is provided a method for driving an organic light emitting display device with a power supply unit including a power block and a controller, the method including: concurrently transferring an input power to an input terminal and an enable terminal of the power block, and suspending the power block from outputting an output voltage in accordance with a voltage of the input power transferred to the enable terminal; transferring a control signal to the controller to adjust the voltage input into the enable terminal to enable the power block to be driven; and starting driving of the organic light emitting display device with the output voltage output from the power block.

With the power supply unit and the organic light emitting display device using the same according to the embodiments of the present invention, the power supply unit stably outputs the voltage from the output power, making it possible to prevent or reduce damage to the devices and the organic light emitting display device from being damaged from receiving the output power from the power supply unit.

BRIEF DESCRIPTION OF THE DRAWINGS

The accompanying drawings, together with the specification illustrate exemplary embodiments of the present invention, and, together with the description, serve to explain the principles of the present invention.

DETAILED DESCRIPTION OF EXEMPLARY EMBODIMENTS

Figure 1:
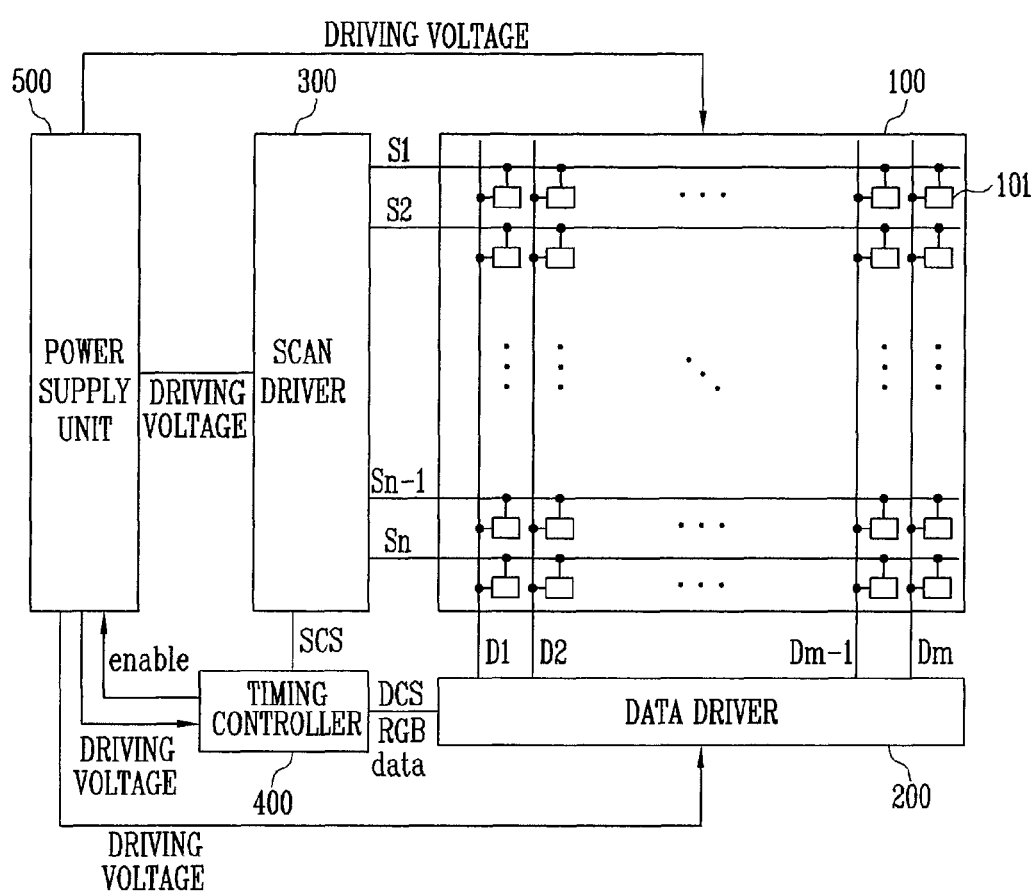
FIG. 1 is a schematic diagram showing an organic light emitting display device according to an embodiment of the present invention.

Hereinafter, certain exemplary embodiments according to the present invention will be described with reference to the accompanying drawings. Here, when a first element is described as being coupled or connected to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Hereinafter, exemplary embodiments according to the present invention will be described with reference to the accompanying drawings.

FIG. 1 is a schematic diagram showing an organic light emitting display device according to an embodiment of the present invention. Referring to FIG. 1, the organic light emitting display device includes a display region 100, a data driver 200, a scan driver 300, a timing controller 400, and a power supply unit 500.

The display region 100 includes a plurality of pixels 101, wherein each pixel 101 includes an organic light emitting diode that emits light corresponding to a flow of current. The display region 100 is provided with n number of scan lines S1, S2, ..., Sn−1 and Sn extending in a row direction for transferring scan signals, and m number of data lines D1, D2, ..., Dm−1 and Dm extending in a column direction for transferring data signals.

The display region 100 is driven by receiving a first power ELVDD and a second power ELVSS from the power supply unit 500. Therefore, the display region 100 displays an image by allowing a current to be flowed to the organic light emitting diodes to emit light in accordance with the scan signals, the data signals, the first power ELVDD, and the second power ELVSS.

The data driver 200 generates data signals by using image signals having red, blue, and green components. The data driver 200 applies the generated data signals via the data lines D1, D2, ..., Dm−1, and Dm coupled to the data driver 200 to the display region 100. Also, the data driver 200 is operated by receiving driving voltage from the power supply unit 500.

The scan driver 300, which generates scan signals, is coupled to the scan lines S1, S2, ..., Sn−1, and Sn to transfer the scan signals to a specific row of pixels 101 of the display region 100. The pixels 101 provided with the scan signals are provided with the data signals output from the data driver 200 so that the voltages corresponding to the data signals are transferred to the pixels 101. The scan driver 300 is operated by receiving the driving voltage from the power supply unit 500.

The timing controller 400 controls the driving of the data driver 200, the scan driver 300, and the power supply unit 500. In particular, the timing controller 400 transfers an enable signal (enable) to the power supply unit 500 to determine a time when output power is output from the power supply unit 500.

The power supply unit 500 transfers the output voltage to the display region 100, the data driver 200, the scan driver 300, and the timing controller 400 as the driving power to allow them to be driven. The power supply unit 500 is driven by the enable signal enable transferred from the timing controller 400 and the voltage from the input power Vin, wherein the driving is suspended by the input power in the early stage of driving, and the operation is determined by the enable signal enable after a set or predetermined time elapses. Therefore, the operation of the power supply unit 500 is controlled by the input power before the enable signal enable output from the timing controller 400 in the early stage of driving reaches the power supply unit 500.

Figure 2:
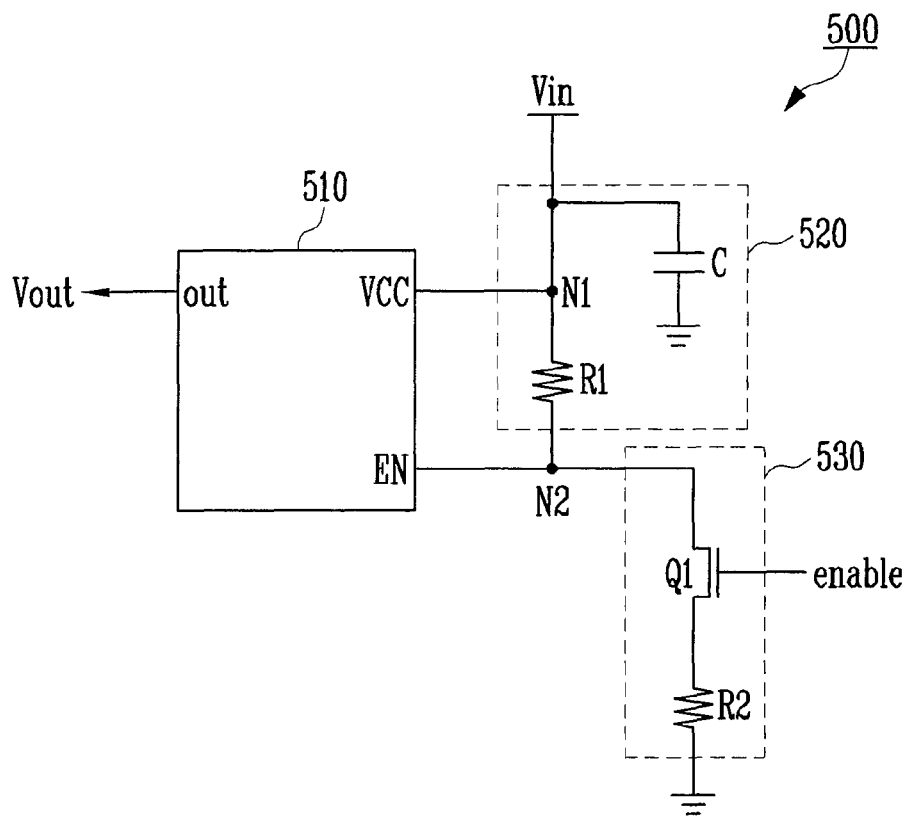
FIG. 2 is a schematic diagram showing a power supply unit of FIG. 1.

FIG. 2 is a schematic diagram showing a power supply unit of FIG. 1. Referring to FIG. 2, the power supply unit 500 includes a power block 510 that receives an input power Vin to output an output power Vout, an input power unit 520 that transfers the input power Vin to the power block 510, and a controller 530 that controls the input power unit 520.

The power block 510 is formed in, for example, an IC chip shape and performs an operation to receive the input power Vin through an input terminal VCC and to output the output power Vout through an output terminal (out). Also, whether the power block 510 is operated is determined by a signal input through an enable terminal EN. The power block 510 is operated when the signal transferred through the enable terminal EN is in a high state, according to an embodiment of the present invention, and is suspended when the signal transferred through the enable terminal EN is in a low state.

The input terminal VCC and the enable terminal EN of the power block 510 are coupled to the input power unit 520. More specifically, the input terminal VCC of the power block 510 is coupled to a first node N1, and the enable terminal EN thereof is coupled to a second node N2.

The input power unit 520 includes a first resistor R1 and a capacitor C, wherein the input power Vin, the first electrode of the capacitor C1, and one end of the first resistor R1 are coupled to the first node N1. The other end of the first resistor R1 is coupled to the second node N2.

The controller 530 includes a transistor Q1 and a second resistor R2, wherein the first electrode of the transistor Q1 is coupled to the second node N2. The second electrode of the transistor Q1 is coupled to one end of the second resistor R2, and the gate thereof receives a control signal transferred from the timing controller 400. The first electrode and the second electrode of the transistor Q1 may be referred to as a source or a drain. The second resistor R2 whose one end is coupled to the second electrode of the transistor Q1 has the other end coupled to a ground (e.g., 0V).

Figure 3:
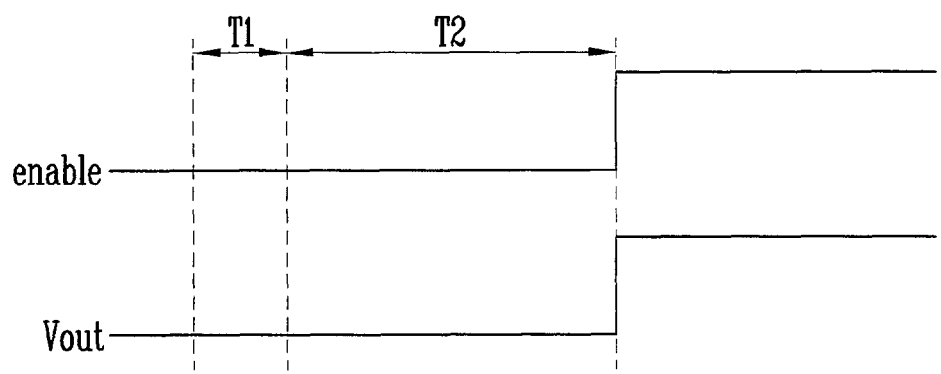
FIG. 3 is a timing diagram showing the operation of the power supply unit of FIG. 2.

FIG. 3 is a timing diagram showing the operation of the power supply unit of FIG. 2. Reviewing the operation of the power supply unit 500 constituted as above with reference to FIG. 3, the enable signal enable is not transferred during a period T1 where the driving starts. Thereby, the transistor Q1 that is, for example, an NMOS type is in a turn-off state. The input power Vin, which is continuously maintained at a set or predetermined voltage by the capacitor C, is transferred to the input terminal VCC. Also, the enable terminal EN receives the input power Vin through the first resistor R1. Here, the operation of the power block 510 is stopped by receiving a low voltage at its enable terminal EN which is coupled to the second node N2 at the low voltage resulted from the voltage distribution or division of a voltage of the input power Vin between the internal resistance within the power block 510 and the first resistor R1.

In other words, the enable terminal EN receives the signal in a low state at the same time point when the input power Vin is transferred to the input terminal VCC. Therefore, the power block 510 can be controlled even before the enable signal enable is output from the timing controller 400. Consequently, the abrupt change of voltage output from the output terminal out can be blocked or prevented.

The enable signal enable maintains a low state during a period T2 where the timing controller 400 starts to operate by receiving power to transfer a signal in a low state to the power supply unit 500 so that the transistor Q1 is in a turn-off state. Therefore, the output power is not output from the output terminal out by performing the same operation as that in the T1 period.

Thereafter, at the time point when the output voltage is to be output from the output terminal out of the power supply unit 500, the enable signal enable in a high state is output from the timing controller 400 so that the power supply unit 500 is driven to output its output voltage. At this time, the transistor Q1 is in a turn-on state. If the transistor Q1 is in a turn-on state, the first resistor R1 and the second resistor R2 are coupled in series between the input power Vin and the ground, and therefore, the voltage divided by the first resistor R1 and the second resistor R2 is transferred to the second node N2. The voltage in a high state is formed at the second node N2 by a suitable resistance ratio between the first resistor R1 and the second resistor R2. In other words, a signal in a high state is transferred to the enable terminal EN.

If the signal in a high state is transferred to the enable terminal EN, normal output voltage is output through the output terminal out so that the power supply unit 500 outputs a set or predetermined output voltage.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A power supply unit comprising:
    a power block comprising an input terminal for directly receiving an input voltage of the power supply unit, an output terminal for outputting an output power, and an enable terminal for receiving an enable voltage to control a driving of the power block, the input voltage being a set constant voltage, and the enable voltage being a division of the input voltage;
    an input power unit configured to concurrently transfer the input voltage to the input terminal and the division of the input voltage to the enable terminal, the enable voltage at the enable terminal being at a low state initially after receiving the input power, wherein the input power unit comprises:
        a first resistor coupled between the input terminal and the enable terminal, and
        a capacitor having a first electrode coupled to the first resistor and the input terminal, and a second electrode coupled to a base power supply; and
    a controller configured to control the voltage of the input voltage transferred to the enable terminal to determine a driving time point of the power block, and configured to drive the power block to enable or suspend output of the output power by changing the voltage at the enable terminal between the low state and a high state, wherein the controller comprises a transistor having a first electrode coupled to the enable terminal of the power block, a second electrode coupled to a second resistor, and a gate for receiving a timing control signal, the second resistor being coupled between the second electrode of the transistor and the base power supply.

2. The power supply unit as claimed in claim 1, wherein the input power unit is configured to transfer the input voltage to the input terminal and the division of the input voltage to the enable terminal, the enable terminal being input with a voltage lower than that of the input terminal.

3. The power supply unit as claimed in claim 1, wherein the base power supply is a ground voltage power supply.

4. An organic light emitting display device comprising:
    a display region configured to receive data signals and scan signals to display an image;
    a timing controller configured to generate control signals;
    a data driver configured to transfer the data signals to the display region;
    a scan driver configured to transfer the scan signals to the display region; and
    a power supply unit configured to transfer a driving power to at least one of the display region, the data driver, and the scan driver,
    wherein the power supply unit comprises:
        a power block comprising an input terminal for directly receiving an input voltage of the power supply unit, an output terminal for outputting an output power, and an enable terminal for receiving an enable voltage for controlling a driving of the power block, the input voltage being a set constant voltage, and the enable voltage being a division of the input voltage;
        an input power unit configured to concurrently transfer the input voltage to the input terminal and the division of the input voltage to the enable terminal, the enable voltage at the enable terminal being at a low state initially after receiving the input power, wherein the input power unit comprises:
            a first resistor coupled between the input terminal and the enable terminal, and
            a capacitor having a first electrode coupled to the first resistor and the input terminal, and a second electrode coupled to a base power supply; and
        a controller configured to control the voltage of the input voltage transferred to the enable terminal to determine a driving time point of the power block, and configured to drive the power block to enable or suspend output of the output power by changing the voltage at the enable terminal between the low state and a high state, wherein the controller comprises a transistor having a first electrode coupled to the enable terminal of the power block, a second electrode coupled to a second resistor, and a gate for receiving a timing control signal, the second resistor being coupled between the second electrode of the transistor and the base power supply.

5. The organic light emitting display device as claimed in claim 4, wherein the input power unit is configured to transfer the input voltage to the input terminal and the division of the input voltage to the enable terminal, the enable terminal being input with a voltage that is lower than that of the input terminal.

6. A method for driving an organic light emitting display device with a power supply unit comprising a power block and a controller, the method comprising:
    concurrently transferring an input voltage of the power supply unit directly to an input terminal and a division of the input voltage to an enable terminal of the power block, and suspending the power block from outputting an output voltage in accordance with a voltage of the division of the input voltage provided to the enable terminal, the division of the input voltage at the enable terminal being at a low state initially after receiving the input voltage at the input terminal, wherein the input voltage is a set constant voltage, and the enable voltage is a division of the input voltage, wherein the power supply unit comprises:
        a first resistor coupled between the input terminal and the enable terminal, and
        a capacitor having a first electrode coupled to the first resistor and the input terminal, and a second electrode coupled to a base power supply;

transferring a timing control signal to the controller to drive the power block to enable or suspend output of the output voltage by changing the voltage input into the enable terminal between the low state and a high state; and starting driving of the organic light emitting display with the output voltage output from the power block, wherein the controller comprises a transistor having a first electrode coupled to the enable terminal of the power block, a second electrode coupled to a second resistor, and a gate for receiving the timing control signal, the second resistor being coupled between the second electrode of the transistor and the base power supply.

7. The method for driving the organic light emitting display device as claimed in claim 6, wherein the voltage input into the enable terminal is controlled by dividing the voltage of the input voltage through a switching operation.

8. A power supply unit comprising:

a power block comprising an input terminal for directly receiving an input voltage of the power supply unit, an output terminal for outputting an output power, and an enable terminal for receiving an enable voltage to control a driving of the power block, the input voltage being a set constant voltage, and the enable voltage being a division of the input voltage;

an input power unit configured to concurrently transfer the input voltage to the input terminal and the division of the input voltage to the enable terminal, a voltage of the input power at the enable terminal being at a low state initially after receiving the input power so that the power block is not driven to output the output power; and a controller configured to control the voltage of the input voltage transferred to the enable terminal to determine a driving time point of the power block, and configured to change the voltage at the enable terminal from the low state to a high state to drive the power block to output the output power.

* * * * *